United States Patent [19]

Waaske

[11] 4,274,728
[45] Jun. 23, 1981

[54] FILM CASSETTE

[76] Inventor: Heinz Waaske, Am Hasengarten 2, 3300 Braunschweig, Fed. Rep. of Germany

[21] Appl. No.: 156,210

[22] Filed: Jun. 3, 1980

[30] Foreign Application Priority Data

Jun. 23, 1979 [DE] Fed. Rep. of Germany ....... 2925496

[51] Int. Cl.³ .................... G03B 17/26; G03B 17/36
[52] U.S. Cl. ................................. 354/275; 354/217
[58] Field of Search ......................... 354/275, 288, 217

[56] References Cited

U.S. PATENT DOCUMENTS

| 461,308 | 10/1891 | Blair et al. | 354/275 X |
| 477,243 | 6/1892 | Brownell | 354/217 X |
| 657,942 | 9/1900 | Juruick | 354/275 X |
| 2,911,894 | 11/1959 | Hennig et al. | 354/275 X |
| 3,728,949 | 4/1973 | Edwards | 354/275 X |
| 3,780,634 | 12/1973 | Van Osch | 354/275 |

FOREIGN PATENT DOCUMENTS 619811 10/1935 Fed. Rep. of Germany ........... 354/288

Primary Examiner—Donald A. Griffin
Attorney, Agent, or Firm—Michael J. Striker

[57] ABSTRACT

The film cassette includes a main part having a chamber for the film supply and a detachable part movable transversely to the longitudinal direction of the main cassette part and supporting for rotation a take-up spool; a sprocket roller for engaging the film is arranged in the main cassette part between the supply chamber and the take-up spool and being engageable by a first driving gear by means of a clutch controlled by the film transport mechanism in the camera and a manually operable pushbutton provided on the main cassette part; a blocking mechanism for the sprocket roller cooperates with the detachable cassette part to block the roller when the latter part is in its displaced position and an arresting mechanism is arranged in the detachable part to permit the rotation of the take-up spool in the direction opposite to the feeding direction of the film when at least a portion of the film is wound up on the take-up spool and to arrest the rotation of the take-up in the opposite direction when the spool is empty.

34 Claims, 7 Drawing Figures

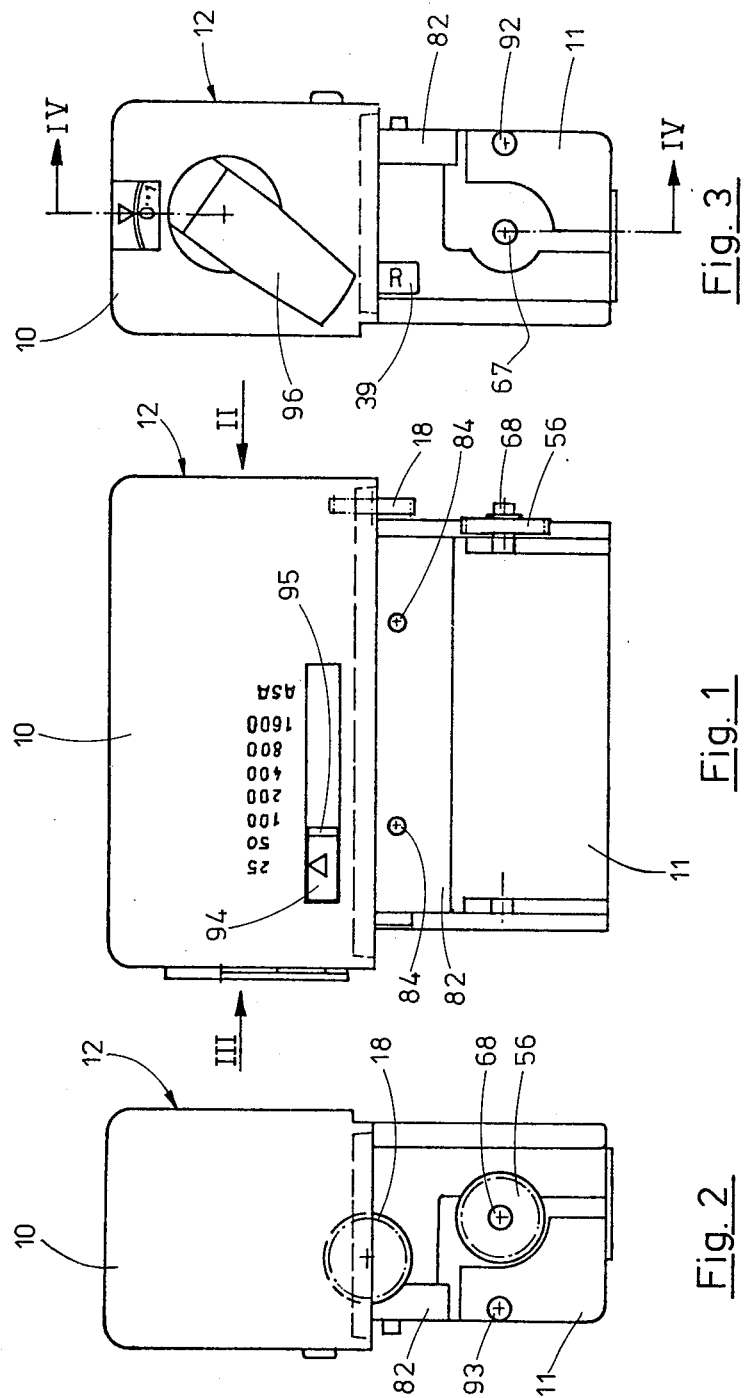

FILM CASSETTE

BACKGROUND OF THE INVENTION

The present invention relates in general to a film cassette for use in connection with a photographic camera and, in particular, to a film cassette of the type having a supply-or main part for accommodating a film supply and an insert part detachable from the supply part and including a film take-up spool whereby in the attached or sealing position the two parts of the cassette form a light-tight housing unit.

The cassette of this type has the advantage that it is compact and space saving, has a flat configuration and consequently it can be easily handled by the operator of the camera. Such a cassette can be operated without any additional light enclosures and consequently it can be readily installed in and withdrawn from the camera. The insertion of the film supply into the cassette is simple and can be made by the user himself and consequently the selection and exchange of the film is considerably facilitated.

In a known film cassette of similar type the cassette is first inserted into the camera whereupon the detachable insert part of the cassette is gripped by the camera mechanism and is dispatched into an end position during each cocking of the shutter and the advance of the film past the film window. In doing so, a certain film length is withdrawn from the supply reel arranged in the supply or main part of the cassette and is positioned behind the film gate or window. The film gate is formed in a film compression frame which is shiftable in the direction of the optical axis and presses the film against a film compression plate. Upon the release of the camera shutter the film compression frame is again withdrawn from the film compression frame and gives way for the repeated passage of the cassette insert part. At the same time. The insert part is again moved by the action of a drive back into its starting position in contact with the supply part of the cassette. Simultaneously the drive rotates the film take-up spool and the exposed portion of the film is wound up on the take-up spool. During the new cocking of the camera shutter and during the actuation of the film advance lever the above-described process is repeated whereby during the travel of the insert part of the cassette into its detached end position the film take-up spool is arrested in the direction opposite to that of the film winding so that the film could not be withdrawn from the take-up spool.

This known film cassette necessitates, however, a very complicated winding mechanism in the camera inasmuch as during each photographic shot the cassette insert part has to be moved back and forth relative to the cassette film supply part irrespective of the fact whether the cassette is about to be exchanged or not. The film transport mechanism of this kind is unsuitable for the so-called "fast winding", which in contemporary high efficiency cameras is normally required.

Moreover, due to the above-described complicated winding mechanism the designer of the camera employing such a known film cassette is subject to limitations in the construction of the camera especially as far as the configuration of the camera is concerned because the spacing between the two end positions of the cassette insert part, namely the starting position in union with the supply part and the detached position in the camera, has to correspond exactly to the length of a film image and is permitted only slightly to exceed this length in order to avoid unnecessary waste of the film material.

Furthermore, such a known film cassette is unsuitable for use in connection with film rolls having perforated edges such as small picture film roll having the format of 24 times 36 millimeters. For the film of such format the stroke of one film transport is preset by shifting means arranged in the camera and activated by the film transport gears. This shifting mechanism serves simultaneously for pulling a predetermined film length from the film cartridge. For construction reasons, the shifting means cannot engage the film when the above-described known film cassette is employed.

SUMMARY OF THE INVENTION

It is, therefore, a general object of the present invention to overcome the aforementioned disadvantages.

More particularly, it is an object of the invention to provide an improved film cassette which while maintaining all above-described advantages of the prior art cassettes, is not possessed of their disadvantages.

An additional object of the invention is to provide such an improved film cassette which gives more freedom to a camera designer in designing the camera configuration.

A further object of the invention is to make possible a fast winding action comparable to that in the cameras without the exchangeable film cassette.

Furthermore, an object of the invention is to provide a film cassette which is usable in connection with cameras for small format films.

In keeping with these objects and others which will become apparent hereafter, one feature of the present invention resides, in a film cassette for use in combination with a photographic camera having a film transport means and a cassette retracting means, in the provision of a cassette assembled of two parts, one part being adapted for accommodating a film supply and the other part being detachable from the first part and movable by the retracting means between a detached position and a closed position in which it forms with the first part a light tight housing unit, the detachable part including a take-up spool driven by the film transport means and alternatively by the retracting means for rotation in a film advancing direction, the first or supply part supporting for rotation a sprocket roller engaging the unexposed portion of the film, a separate driving member connectable to the film transport means, a clutch provided between the sprocket roller and the driving member, a manually operable controll mechanism arranged on the supply part to control the disengagement of the clutch from the driving member, means for blocking the sprocket roller when the detachable part of the cassette is being displaced from its closed position into its detached position, and arresting means arranged in the detachable cassette part and cooperating with the take-up spool and with the film to permit the rotation of the take-up spool in the direction opposite to the film advancing direction when at least a length of the film is wound up on the take-up spool and to arrest the rotation of the spool in the opposite direction when the spool is empty.

The film cassette according to this invention has all advantages of known cassettes of this type. It is small, compact and flat and operates without additional light inhibiting elements such as cassette sliders and the like which hitherto have been separately inserted into the cassette by the camera user when the cassette was to be exchanged. The design of the film cassette of this invention is such that once the detachable part of the cassette is displaced into its detached end position in the camera it remains in this end position during all consecutive picture taking operations whereby the take-up spool arranged in the detachable part is in engagement with the conventional fast action lever for the cocking of the shutter and for the film transport. Only during the exchange of the film cassette the detachable part has to be retracted into the main or supply part of the cassette.

By virtue of the sprocket roller which is arranged in the supply part of the cassette the film feeding step which is determined by the film transport gears provided in the camera is independent from the format of the film inasmuch as the sprocket roller withdraws always a preset length of the film supply chamber which can accommodate for example a cartridge with a small format film. At the same time it is insured that when a new film roll from which not a single image has been exposed is inserted into the film supply chamber of the cassette the detachable cassette part can be displaced without obstacles into its end position in the camera whereby a corresponding length of the film from the film supply or from the film cartridge is withdrawn. The distance of the end position of the detachable cassette part in the camera can be selected for an arbitrary length of the film image without causing a larger spacing between the consecutive exposed film images than that in conventional small picture format cameras having no exchangeable cassettes. The camera designer therefore is not bound by invariable construction criteria when designing the shape of the camera which exceeds the dimensions of the film cassette of this invention.

The film cassette can be instantly exchanged because the cassette is inserted into the camera in the most simple manner and upon the return of the detachable part, discharged therefrom into its starting position to unite with the supply cassette part. Any manipulation with separate light covers is completely dispensed with.

In a further elaboration of this invention, the control mechanism is coupled to the driving member of the sprocket roller. In this manner the construction of the cassette is considerable simplified on the one hand and insures that the clutch is positively shifted into engagement with the activated film transport gears in the camera.

In another embodiment, the main or supply part of the cassettes includes a film supply chamber separated from the sprocket roller and further including a picture frame counting or indicating mechanism which is included in the control mechanism for the clutch. Due to this combination of the counting mechanism with the control mechanism, the same structural component parts have a multiple use in performing different functions which in turn results in the reduction of manufacturing costs and at the same time reduces the size and the weight of the film cassette.

In the preferred embodiment of this invention, the clutch is in the form of a jaw coupling which is biassed by a spring into its engaging position and cooperates with a manually operated pushbutton at the outer surface of the cassette housing which disengages the clutch simultaneously with the actuation of the rewinding and unblocking means. In this manner, the clutch is used not only for its coupling function but also for the rewinding of the film as well as for unblocking of the film transport gears and of the shutter cocking lever in the event when the free cocking movement of the lever can no longer be completed due to the termination of the film.

In another modification of this invention, the blocking means are coupled to the detachable cassette part in such a manner that they block the driving member of the sprocket roller when the detachable part is moved from its detached position into its starting position in contact with the supply cassette part and during the movement in opposite direction the driving member is unblocked. The blocking device also insures that when the cassette is removed from the camera the projecting driving member for the sprocket roller is arrested and cannot be accidentally turned.

In the preferred embodiment of this invention, the arresting means for the take-up spool include a ratchet wheel coaxially arranged on the take-up spool and cooperating with a spring-load locking pawl which is pivotable into a contact with a marginal portion of the film and disconnects the arresting mechanism when a film is taken up on the spool. The ratchet wheel and pawl mechanism insures in a very simple and reliable manner that the arresting mechanism is actuated only in the case of an empty take-up spool when a leading film tongue cut out from the end of the film is inserted in the slit in the take-up spool while the part of the spool opposite the sensing pawl is empty. As soon as the first portion of the full size film is wound up on the core of the take-up spool the sensing pawl is lifted and disengages the teeth of the ratchet wheel thus making the arresting mechanism ineffective until the exposed film is rewound.

According to another advantageous feature of this invention, the main or supply part of the cassette includes a releasing element for unlocking the arresting mechanism of the film take-up spool when the two cassete parts are in their unified position. This releasing or unlocking element is formed by a projection arranged on the cassette unit and projecting into the path of movement of the detachable cassette part in such a manner as to lift the arresting lever or pawl of the arresting device. This releasing or unlocking element has the advantage that during the rewinding of the film the latter can be completely withdrawn from the take-up spool and wound up into the film cartridge including the narrow tongue portion at the leading end of the film.

The film take-up spool is coupled to the film transport gears in the camera by means of a frictional coupling which compensates for the shorter rotary path of the take-up spool in increasing diameter of the film roll.

Between the driving member for the take-up spool and the driven shaft of the take-up spool there is arranged a free wheeling coupling in the form of a ratchet which enables the rotation of the driving element against the film feeding direction. In this manner it is attained that during the displacement of the detachable cassette part from the main cassette part, that means during its travel into the end position in the camera, the same length of the unexposed film which has been previously wound up on the take-up wheel can now be again withdrawn from the take-up spool.

The arresting device together with the arresting pawl are located on the opposite end of the free wheeling coupling.

Both ends of the driven shaft of the take-up spool project above the upper surface of the detachable cassette part to serve as guiding members which are engageable into corresponding grooves in the camera so as to guide the detachable part on a well-defined rack.

The sprocket roller is arranged between the film supply chamber of the main cassette part and the take-up wheel of the detachable part. This arrangement contributes to a flat configuration of the film cassette which thus attains an elongated form which is more suitable for transportation and can be carried by the camera user in a shirt or a trouser pocket.

In another modification of this invention, the cassette housing is formed with a slot-like opening extending close to the separation line between the cassette parts, the opening corresponding in length at least to the width of the film strip and is covered light tightly by a locking slider which is movable on the main part of the cassette. This slot-like opening enables that the detachable cassette part can be moved past the image gate in the camera without obstacles on the one hand and enables a levelled and stretched position of the film in the camera without any deformation of the film. The locking sliders covering the slot perform simultaneously the light shielding function and the locking function. This locking slider is movable in the direction of the longitudinal axis of the cassette and is loaded by a resetting spring which holds the slider in its locking position. The slider is provided which a transversely projecting cam which upon insertion of the film cassette into the camera automatically unlocks the slider and opens the slot-like opening and simultaneously lifts the arresting elements between the detachable and the supply parts of the cassette without the necessity of any additional attention and manipulation by the camera user.

In still another modification of this invention, the main or supply part of the camera is provided with a longitudinally shiftable film sensitivity indicator which has a bridge-like scanning element scanned by the film sensitivity feeler of the camera. This feature makes it possible that the manually adjusted film sensitivity indicator serves not only as the reminder for the camera user which film is now present in the cassette but at the same time serves for the automatic setting of the film sensitivity control elements in the camera as soon as the film cassette is inserted therein.

BRIEF DESCRIPTION OF THE DRAWINGS

FIG. 1 is a top view of the cassette of this invention;

FIG. 2 is a side view taken in the direction of arrow II in FIG. 1;

FIG. 3 is a side view taken in the direction of arrow III in FIG. 1;

DESCRIPTION OF THE PREFERRED EMBODIMENTS

Figure 4:
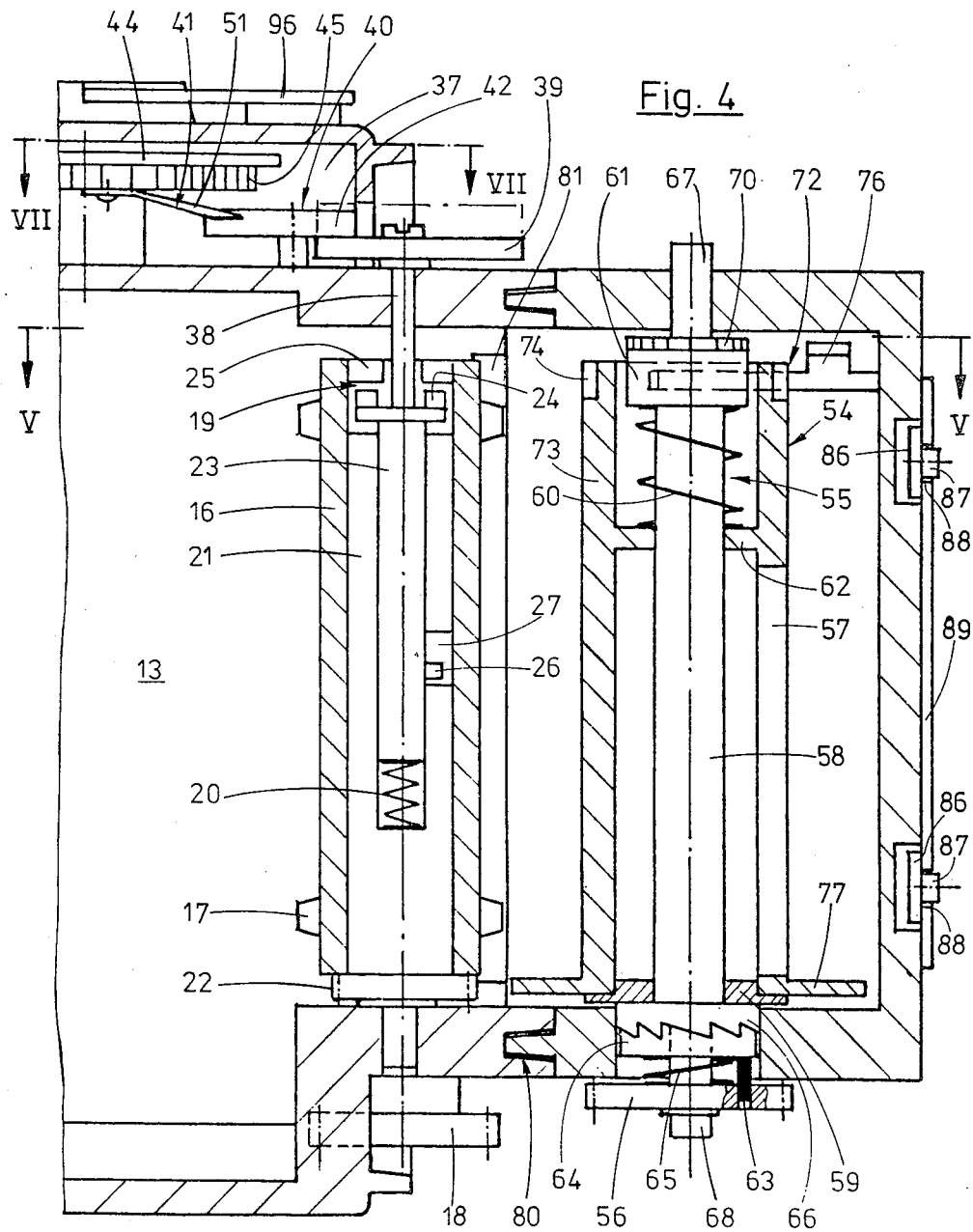
FIG. 4 is a sectional rear view taken along the live IV—IV in FIG. 3, of a cutaway portion of the cassette of FIG. 1 shown on an enlarged scale.

The film cassette as illustrated in the Figures has a cassette main or supply part 10 and a detachable cassette part 11 whereby in the connected condition the two parts form a light tight housing unit 12. The cassette main part 10 includes a film supply chamber 13 (FIGS. 4–6) into which a film cartridge 14 can be inserted. The film cartridge contains a roll of film for example a small picture format film (24×35 millimeters) which is perforated at both sides. The film is indicated by reference numeral 15 in FIGS. 5 and 6.

The supply or main cassette part 10 supports for rotation a sprocket roller 16, so called a perforation roller, having at both ends thereof sprockets 17 dimensioned so as to engage successive perforation of the film 15. The sprocket roller 16 is driven by a driving member supported for rotation on the cassette housing 12 and in this example the driving member has the form of a gear 18. The gear 18 is shaped such as to engage upon the insertion of the film cassette into a camera the film transport gear mechanism which is driven by the manually operated film feeding and shutter cocking lever of the camera. A clutch 19 is arranged between the sprocket roller 16 and the driving gear 18 (FIG. 4) which in this example is in the form of a jaw coupling. The clutch 19 is supported on a coupling rod 23 which is axially movable in a blind bore provided in cylindrical insert 21 rotable in the sprocket roller. The end face of the cylandrical body 21 remote from the clutch 19 is rigidly connected to the gear 22 whereas the end wall of the hollow sprocket roller 16 facing the clutch 19 is in the form of a face gear 25 engageable with the jaws 24 of the clutch. The coupling rod 23 and thus the clutch 19 are normally urged into the coupling position by a pressure spring 20 arranged at the bottom of the blind bore in the cylindrical body 21. The coupling rod is provided on its surface with a radially projecting pin 26 which engages an axially directed longitudinal slot 27 in the cylindrical body 21 so that the coupling rod 23 together with the clutch 19 are axially movable with respect to the cylindrical insert 21 but coupled for joint rotation therewith. The driving gear 18 is rigidly connected to one end of a rotary shaft 28 (FIG. 5) which also supports for joint rotation a transmission gear 29 which is in a permanent engagement with the gear 22 of the rotary cylindrical body 21 of the clutch 19. The free end of the shaft 28 projects through the housing of the cassette part 10 and cooperates with an arresting device 30 which becomes effective only when the two cassette parts 10 and 11 are attached one to another and becomes ineffective when the detachable cassette part 11 is withdrawn. In the effective position of the arresting device 30 the latter blocks the driving shaft 28 in either direction of its rotation. The arresting device 30 includes an arresting gear 31 which is rigidly connected to the free end of the driving shaft 28 and a locking pawl 33 having a locking nose 32 which is engageable with the teeth of the locking gear 31. The locking pawl 33 is pivotably supported on the housing of the main cassette part 10 and is loaded by a spring 34 into a position in which the locking nose 32 is out of engagement from the locking gear 31. In other words, when the detachable cassette part 11 is withdrawn from the main cassette part 10, the spring 34 turns the locking lever 33 counterclockwise and the locking nose 32 disengages the teeth of the gear 31. As a consequence, the driving shaft 28 is released and can be rotated by means of the driving gear 18. As soon as the detachable cassette part 11 is returned into its starting position in which it is united with the main cassette part 10, the swung up arresting lever 33 is pushed by a projection 97 clockwise against the force of the spring 34 and the locking nose 32 engages the teeth of the arresting gear 31. The driving shaft 28 thus becomes blocked and cannot be rotated via the driving gear 18 by the transmission gears of the feeding mechanism in the camera.

The clutch 19 can manually be disengaged from the face gear 25 of the sprocket roller 16 and is brought into engagement with the latter by means of a control mechanism 35 (FIG. 7) which is designed so as to be activated also by the film feeding mechanism when the film cassette is attached to the camera. For this purpose, the control mechanism 35 is coupled to the driving gear 18 for the sprocket roller 16. A part of the control mechanism 35 is constituted by a film frame counting mechanism 36 which is arranged on the main or supply part 10 of the cassette in a light tight chamber 37 separated from the film supply chamber 13.

The clutch 19 as mentioned above, can be manually disengaged by means of pushrod 38 which as seen from FIG. 4 rests on the projecting face of the coupling rod 23 and displaces the same together with the clutch 19 in axial direction against the force of the spring 20 in the blind bore whereby the jaws of the clutch 19 disengage the teeth of the face gear 25. For the actuation of the pushrod 38, there is provided on the upper surface of the cassette housing 12 a pushbutton 39 which is rigidly connected to the rod 38. The pushbutton 39 act simultaneously as a control element for the rewinding and unblocking of the cassette.

The control mechanism 35 includes an arresting element 40 in the form of an elbow lever 42 which with one arm thereof abuts against the pushbutton 39 whereas the other arm of the element 40 extends in the path of movement of a clutch disengaging element 41. The elbow lever 42 is pivotably supported in the frame counting chamber 37 and is spring-biassed by a spring 43 so as to keep the pushbutton 39 in its rest position in which the clutch 19 is disengaged from the sprocket roller 16 (full lines in FIG. 7). In this normal position the other arm of the elbow lever 42 projects into the path of movement of the clutch disengaging element 41. This element 41 is arranged as mentioned before on the frame counting mechanism 36 and during each stepwise movement of this mechanism 36 the element 41 rotates the lever 42 against the force of the spring 43 and thus brings the clutch 19 into its coupling position in which it is in engagement with the sprocket roller 16.

The film frame counting mechanism 36 includes a rotary frame counting disk 44 which is provided with index numeral indicating the amount of exposed pictures. The frame counting disk 44 supports a ratchet wheel 45 cooperating with a ratchet pawl 46 which is supported in the frame counting chamber 36 for a rotary and a longitudinal movement. This rotary and simultaneously longitudinal movement of the pawl 46 is effected by means of an elongated guiding slot 47 for the pivot pin of the pawl and by means of resetting spring 48. The ratchet pawl 46 is at one end thereof in engagement with the teeth of the ratchet wheel 45 and the other end of the pawl is provided with a projection 49 which extends through an opening in the wall of the frame counting chamber 37 and reaches the range of the driving shaft 28. The end face of the driving shaft 28 is provided with an eccentric cam 50 which during the rotation of the shaft 28 engages the projection 49 and drives via the pawl 46 and the ratched wheel 45 the picture counting disk 44 to rotate about the increment of one tooth. The clutch disengaging element 41 in this example is in the form of a switching tongue 51 which is secured to the frame counting disk 44 in such a manner that in the "0" position of the latter, the tip of the tongue 51 is located immediately in front of the arresting element 40 that is opposite the other arm of the lever 42. When the film feeding mechanism in the camera now rotates the driving gear 18, the driving shaft 28 turns via the eccentric shaft 50, the ratchet pawl 46 and the wheel 44, the frame counting disk 44 about the increment of one tooth of the ratchet wheel. As a result, the switching tongue 51 turns the arresting lever 42 against the force of the spring 43 in the position indicated by dash and dot lines in FIG. 7 so that the arresting lever 42 releases the pushbutton 39. As a consequence, the pressure spring 20 displaces the coupling rod 23 and brings the jaws of the clutch 19 into engagement with the sprocket roller 16. The push-button 39 is now displaced by the pushrod 38 to the same level as the arresting lever 42 and holds the latter in this angularly displaced position. By each subsequent forward movement of the film feeding mechanism produced by the actuation of the cocking lever, the frame counting disk 44 is stepwise rotated about an increment corresponding to the tooth division of the ratchet wheel 45 and the register mark 52 indicates the corresponding number of the exposed picture frames.

Figure 7:
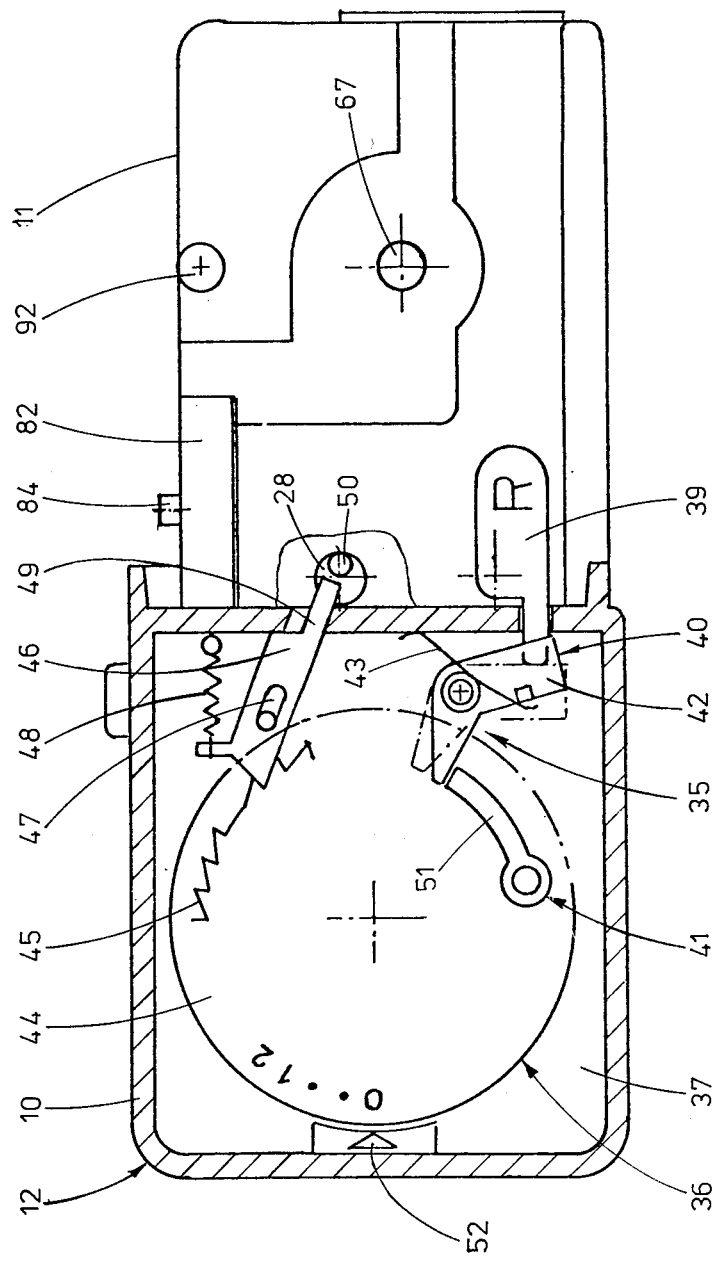
FIG. 7 is a view similar to FIG. 3 shown in a partial section taken along the line VII—VII of FIG. 4.

The film cassette has a rear wall 53 hinged on the main cassette part 10 to enable access in the interior of the cassette when the film is exchanged. The frame counting mechanism 36 is so coupled to the rear wall 53 that upon opening of the latter the counting mechanism 36 is automatically reset to its "0" position in which the "0" mark on the counting disk 44 registers with the index mark 52 as illustrated in FIG. 7.

The detachable cassette part 11 includes a film take-up spool 54 on the core of which is wound up the film strip withdrawn from the film cartridge 14. The take-up spool 54 is coupled via a slipping or torque overload clutch 55 to driving element 56 which is also in the form of a driving gear. This driving gear 56 upon insertion of the cassette into the camera engages automatically a corresponding member of the film feeding mechanism. The film take-up spool 54 has a hollow cylindrical core 73 which in conventional manner is provided with an axial slit 57 for receiving the leading tongue of the film strip. The core 73 coaxially surrounds a driving shaft 58 and rests on a flange 59 of the latter. The sliding clutch 55 includes a spiral spring 60 coaxially arranged about a portion of the driving shaft 58 and extending between another flange 61 of the driving shaft and on a radial projection 62 of the inner wall of the core 73 of the take-up spool whereby the latter is resiliently pressed against the flange 59 of the driving shaft 58.

Figure 5:
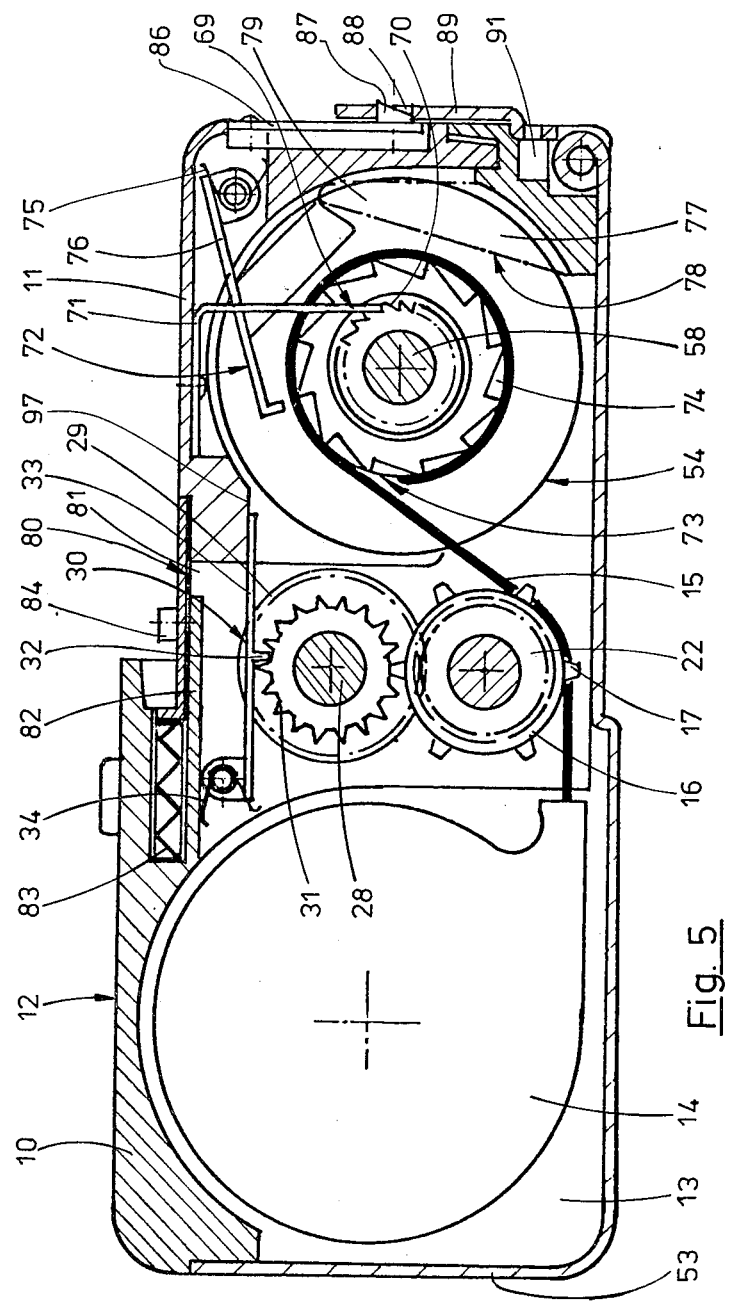
FIG. 5 is a sectional side view taken along the live V—V in FIG. 4.
Figure 6:
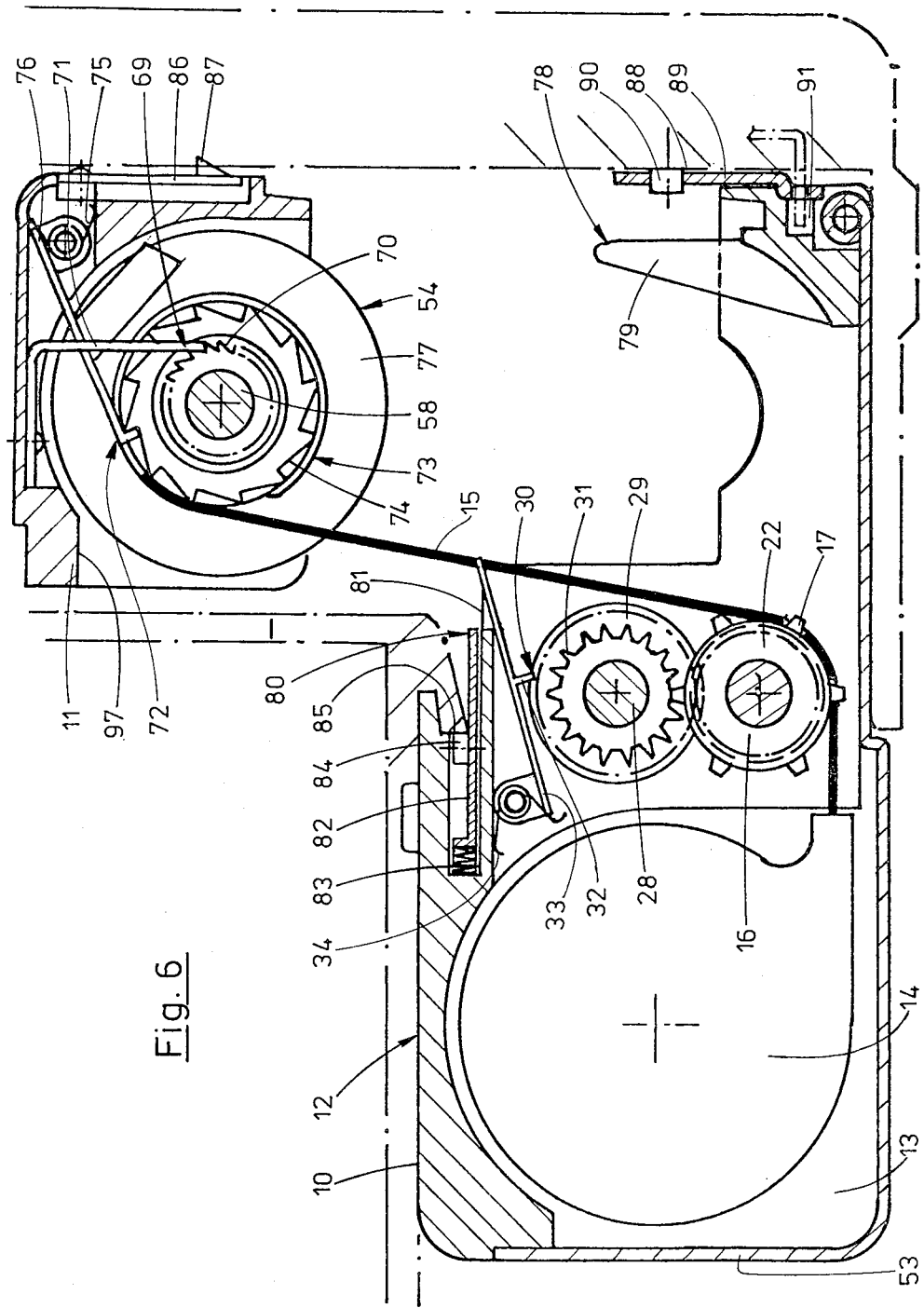
FIG. 6 is a view similar to FIG. 5 but showing the detachable part of the cassette in its working position.

The driving gear 56 is freely rotatable on the driving shaft 58 and is rigidly connected by means of a carrier pin 63 to a first ratchet gear 64. The first ratchet gear 64 is urged by a biasing pressure spring 65 into engagement with a second ratchet gear 66 which is supported for joint rotation on the driving shaft 58 of the take-up spool. Both ratchet gears 64 and 65 constitute a free wheeling ratchet-type coupling which transmits the rotary movement in the film feeding direction of the driving gear 56 to the driving shaft 58 of the take-up spool and at the same time permits free rotation of the driving gear 56 in opposite direction. The driving shaft 58 for the take-up spool is rotably supported in the detachable cassette part 11 and the free ends 67 and 68 of the driving shaft project a given distance above the outer surfaces of the housing of the part 11 and of the driving gear 56. These projecting shaft end portions 67 and 68 are employed as guiding elements which engage corresponding guiding grooves in the camera to guide the cassette part 11 during its detachment. The driving shaft 58 for the take-up spool is provided with an arresting device 69 (FIGS. 5 and 6) which prevents the rotation of the driving shaft 58 counter to the direction of winding. The arresting device 69 includes an arresting ratchet wheel 70 which is arranged on the outer annular surface of the flange 61 of the driving shaft 58 and further includes a spring-biased arresting pawl 71 engaging the ratchet wheel 70 and being supported on the inner surface of the detachable cassette part 11 (FIGS. 5 and 6). The sawteeth of the arresting wheel 70 enable the arresting pawl 71 to slide thereover when the driving shaft 58 rotates in the film feeding direction while it prevents the rotation of the arresting wheel 70 in the opposite direction. The purpose of the arresting device 69 is to prevent rebouncing or springing of the film roll on the take-up spool.

Another arresting ratchet mechanism 72 is provided in the detachable cassette part 11 which engages the film take-up spool 54 and arrests the latter against the rotation in counter direction to the film feeding direction only then when no film is wound on the core 73 of the take-up spool. The function of this arresting ratchet mechanism 72 is to enable the displacement of the detachable cassette part 11 in the camera when only the leading attachment tongue of the film is inserted in the slot 57 of the take-up spool so that during the travel of the part 11 into its end position it pulls out the corresponding length of the film strip 15 from the cartridge 14. During the return movement of the detached cassette part 11 from its end position within the camera toward the main cassette part 10, the driving gear 56 and the film take-up spool 54 rotate in a film feeding direction and consequently the length of the film which had been pulled out during the outward movement of the part 11 is wound back on the take-up spool 54. Due to the fact that the arresting ratchet mechanism 72 is effective only when no full size film takes place on the take-up spool, the winding of the aforementioned film length on the spool renders the arresting mechanism 72 ineffective and only upon a repeated separation of the detachable cassette part 11 from the main cassette part 10 this film length can be unwound from the spool 54.

In the illustrated embodiment the arresting ratchet mechanism 72, a ratchet wheel 74 formed on the core 73 of the take-up spool and a ratchet pawl 76 are pivotably supported on the detachable cassette engagement with the ratchet wheel 74. The latter wheel 74 is arranged at the edge of the end of the core of the take-up spool which surrounds the first arresting mechanism 70 for preventing the springing of the film roll.

The ratchet wheel 74 is arranged out of the range of the narrow leading tongue of the film strip which is attached to the opposite end of the take-up spool and consequently the arresting pawl 76 is permitted to engage the teeth of the ratchet wheel 74 during the initial winding phase of the film roll when the actual full size film strip has not yet reached the take-up spool. As soon as the actual film is wound up on the spool, it covers the ratchet wheel 74 and prevents the ratchet pawl 76 from engaging the latter.

In addition, a releasing element 78 for the ratchet pawl 76 is provided in the main cassette housing 10 to make the arresting ratchet mechanism 72 ineffective in the event when the film take-up spool 54 is empty and the detachable cassette part 11 is fully united with the main cassette part 10. By means of this structural measure it is attained that in rewinding the film 15 into its cartridge the leading tongue of the film strip is also unwound from the take-up spool 54 and consequently the film 15 is completely released and returned into the cartridge 14. This releasing element 78 includes a projection 79 on the inner wall of the main cassette part 10 extending in the path of movement of the cassette part 11 in such a manner that the arresting ratchet pawl 76 abuts against this projection 79 when the part 11 is in its fully retracted position and rotates the pawl against the force of spring 75 away from the core 73 of the spool (FIG. 5).

In the illustrated example of the film cassette of this invention the reciprocable displacement of the detachable cassette part 11 takes place on a path which is substantially transverse to the longitudinal axis of the cassette. In order to design a film cassette which has a flat elongated configuration suitable for handling and transportation, the sprocket roller 16 and the driving shaft 28 for the latter are arranged side-by-side between the film supply chamber 13 and the film take-up spool 54. Both elements 16 and 28 are arranged in close proximity to the separation line 80 between the main cassette part 10 and the detachable part 11. In a portion of the separation line 80 which otherwise is light tight there is provided a slot-like opening 81 (FIGS. 4-6). This slot-like opening is covered by a locking slider 82 which also is light tight. This locking slider serves simultaneously for the locking of the detachable cassette part 11 in the main cassette part 10 (FIG. 5). The length of the slot-like opening 81 is at least equal to the width of the film strip 15. The slot-like opening 81 enables the feeding of the film length from the sprocket roller 16 towards the take-up spool 54 in a flat plane without any deformation (FIG. 6).

The locking slider 82 is axially displaceable in the longitudinal direction of the cassette part 10 and is spring biased into its locking position by a resetting spring 83. In this locking position, the slider 82 not only locks the cassette part 11 to the part 10 but also light tightly covers the slot-like opening 81. The upper surface of the locking slider 82 is provided with two transversely projecting actuation cams 84 which serve for the displacement of the slider 82 into its unlocking position as illustrated in FIG. 6. This displacement of the slider 82 in the unlocking direction against the spring 83 is effected automatically during the insertion of the film cassette into the camera when the two actuation cams 84 abut against a light protecting rim 85 in the camera and during the subsequent movement of the cassette are held stationary. The outline of the camera having the light inhibiting rim 85 is illustrated by dash and dot lines in FIG. 6. The locking slider 82 has a substantially U-shaped cross-section (FIGS. 1-3) and overlaps partially the edges both of the main cassette part 10 and of the detachable part 11.

In addition, the movable cassette part 11 is provided with two locking springs 86 each having a locking nose 87 at its free end. These locking noses resiliently engage corresponding locking recesses 88 provided in the main cassette part 10. The locing recesses 88 are formed in a metal sheet 89 which is secured to the housing 12 in the range of the main cassette 10 by riveting for example. Upon the connection of the film cassette to the camera the locking noses 87 are disengaged from the locking recesses 88 by means of projecting pins 19 provided in the camera whereby these locking recesses 88 serve for positioning and mounting of the film cassette to the camera. An additional recess 91 provided in the proximity to the locking metal sheet 89 in the housing 12 is employed for the reinforcement of the locking of the film cassette to the camera as indicated in FIG. 6.

The detachable cassette part 11 is formed on its opposite side through which also the end portions 67 and 68 of the driving shaft 58 for the take-up spool project, with two carrier pins 92 and 93 (FIGS. 2 and 3) which serve for engaging the detachable cassette part 11 with a driving device in the camera.

The cassette housing 12 in the range of the main cassette part 10 is also provided with a slidable film sensitivity indicator 94 which is manually displaceable along a set of film sensitivity index numbers to be set against a number corresponding to the sensitivity of the film present in the cassette (FIG. 1). The sliding member 94 of the film sensitivity indicator supports also a transversely projecting feeler 95 which upon the insertion of the film cassette into the camera is scanned by a film sensitivity scanning device in the camer whereby the position of the feeler 95 determines the adjustment of the corresponding parameters in the camera.

The film cassette is further equipped with a film rewinding handle 96 by means of which the exposed film strip 15 on the take-up roll 54 is rewound back into the film cartridge 14. Before the initiation of the rewinding process it is necessary as in any conventional type of the camera to compress a rewinding button which in this case is represented by the pushbutton 49. As it has been described before, as soon as the pushbutton 39 is compressed, the clutch 19 between the sprocket roller 16 and its driving gear 18 is disengaged. As a result, the sprocket roller 16 is freely rotatable in both directions, either when the driving gear 18 is stopped by the film feeding mechanism in the camera or, when the driving shaft 28 is arrested, by the arresting device 30 when the film cassette is closed. The pushbutton 39 is held in its compressed position by the locking element 40, that is by the pivotable lever 42 and consequently the clutch 19 remains still in its disengaged position.

The operation of the film cassette of this invention is as follows:

Upon the insertion of a new film cartridge 14 with an unexposed film 15 into the film supply chamber 13 the tip of the cutout film tongue is inserted into the holding slot 57 in the core of the take-up spool 54 and by manually turning the annular flange 77 at one end of the spool core 73, this leading tongue is wound up in the feeding direction on the spool. Thereupon the rear wall 53 of the cassette is closed and the whole cassette unit is inserted into the camera. During the insertion, as described before, the locking slider 82 is pushed back against its biasing spring 83 to open the slot-like opening 81 and to unlock the detachable cassette part 11. At the end of the insertion process projections 90 in the camera enter the locking recesses 88 in the cassette and displace locking cams 87 at the end of the supporting springs 86 from these recesses. In this manner, the cassette is locked in its correct position in the locking recesses 88 and in additional recesses 91 in the camera. A driving device in the camera engages the carrier pins 92 and 93 and displaces cassette part 11 transversely away from the main cassette part 10 to an end position in the camera body.

Due to the fact that only the narrow leading tongue of the film is wound up on the core 73 of the take-up spool 54, the upper half (FIG. 4) of the take-up spool is still empty and consequently the arresting pawl 76 can engage the arresting ratchet wheel 74 of the device 72 and prevents the take-up spool 54 from rotating in the direction opposite to the film feeding direction (FIG. 6). As described before, the clutch 19 remains disengaged from the driving gear 18 and the sprocket roller 16 is free to rotate in either direction. During the displacement of the detachable cassette part 11 into its end position in the camera the take-up 54 is blocked counter the direction of feeding and the sprocket roller 16 is free to rotate and consequently the film 15 is being pulled off the cartridge 14 so long until the cassette part 11 reaches its end position in the camera body. Thereafter the camera is ready for the first shot and upon the actuation of the shutter release button a picture frame is exposed and subsequently the film advance lever is actuated. This lever in a known manner drives the film transport gears and simultaneously cocks the shutter. In driving the film transport gears the driving gear 18 is also set in motion and drives the driving shaft 28 which via the eccentric cam 50 and the coupling pawl 46 angularly displaces the picture counting disk 44 of the counting mechanism 36 about one tooth of the ratchet wheel 45. As explained previously, the switching tongue 51 mounted on the counting disk 44 now turns the pivotable locking lever 42 against the force of its biasing spring 43 into the position which in FIG. 7 is illustrated by dash and dot lines and releases the compressed pushbutton 39. As a result, pressure spring 20 causes the clutch 19 to engage the sprocket roller 16 with its driving gear 18. Thereupon the shutter release pushbutton is activated and the exposed film frame is advanced by the advance lever of the camera. The film transport gears rotate via the driving gear 18, the sprocket roller 16 which in turn withdraws from the film cartridge 14 a length of film corresponding exactly to the length of a picture frame. The film transport gears in the camera simultaneously drive in the film feeding direction the drive gear 56 for the film take-up spool 54 and the exposed film portion is wound up on the spool 54 whereby the arresting ratchet wheel 74 is covered by the film and prevents the pawl 76 from entering the teeth of the ratchet wheel 74 on the take-up thus rendering the whole arresting mechanism 72 ineffective.

If it is now desired to exchange the cassette the driving mechanism provided in the camera for the displacement of the cassette part 11 is activated and the cassette part 11 is moved from its end position to its starting position to unite with the main energetic part 10. The driving mechanism for the cassette engages the driving gear 56 for the take-up spool to turn the same in the film advancing direction and consequently the take-up spool during the movement of the detachable cassette part 11 toward the main cassette part 10 winds up the whole length of the unexposed film 15 which extends between the sprocket roller 16 and the take-up spool 54. Upon the reunion of the cassette part 11 with the main cassette part 10 both cassette parts are automatically locked one to another and the slider 82 light tightly seals the slot-like opening for the film so that the whole cassette is ready for the removal from the camera. At the same time, the arresting nose 32 of lever 33 engages the locking gear 32 on the driving shaft 28 and the sprocket roller 16 is blocked against rotation in both directions.

When the film cassette is reinserted into the camera, the driving mechanism for the casssette located in the camera engages again the carrier pins 92 and 93 and the detachable cassette part 11 is again displaced into its end position in the camera. Due to the fact, however, that a length of an exposed film is already wound on the take-up spool 54, the arresting device 72 as mentioned before, is ineffective. The film take-up spool 54 therefore is free to rotate counter the film feeding direction. During the displacement of the detachable cassette part 11 in the direction away from the main cassette part 10, the locking tongue 32 is displaced from the locking gear 31 so that the arresting device 30 for the driving shaft 28 is made ineffective. Nonetheless, the driving gear 18 for the sprocket roller 16 is brought into engagement with the film transport gears of the camera which at this moment remain unactivated and consequently the gear 18 and thus the sprocket roller 16 are blocked. Due to the blocked sprocket roller 16 and the freely rotatable film take-up spool 54 the detachable cassette part 11 during its trip into its end position in the camera body withdraws from the film cartridge 14 exactly the same length of the unexposed film 15 which has been previously returned into the cartridge during the reverse trip of the cassette part 11 toward the main cassette part 10.

As soon as the detachable cassette part 11 reaches its end position in the camera, the shutter of the latter can be again released and upon the actuation of the film advance lever the camera is again ready for taking the pictures. If the film advance lever is blocked in its movement at the end of the film strip which blocks the actuation of the film transport gears in the camera, the pushbutton 39 is compressed and acts in this case as an unblocking control element. The clutch 19 then disengages the sprocket roller 16 from its driving gear 18 and the latter together with the film transport gears are released so that the cocking movement of the film advance lever in the camera can be completed whereby the sprocket roller 16 remains blocked.

For rewinding the exposed film 15 into the film cartridge 14 the cassette part 11 is again returned into the main cassette part 10. Inasmuch as the pushbutton 39 has already been activated, it is unnecessary to compress it again and only the film rewinding handle 96 is manipulated until the film from the take-up spool is completley rewound in the film cartridge 14. As it has been described before, the releasing element 78 which is effective in the closed position of the cassette part 11 prevents the arresting pawl 76 from engaging the arresting ratchet 74 at the end of the rewinding process and consequently the leading tongue of the film can be also removed from its holding slit in the core of the take-up spool 54.

It will be understood that each of the elements described above, or two or more together, may also find a useful application in other types of constructions differing from the types described above.

While the invention has been illustrated and described as embodied in a film cassette for use with a photographic camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention

What is claimed as new and desired to be protected by Letters Patent is set forth in the appended claims:

1. A film cassette for use in a photographic camera having a film transport means and a cassette control means, said cassette comprising a main part for receiving a supply of film, and a detachable part movable by the control means between an end position in the camera spaced from said main cassette part, and a closed position in which it forms with the main part a light tight housing unit, said detachable part including a rotary take-up spool driven by the film transport means and by the cassette control means to rotate in the film advancing direction, said main part supporting for rotation a sprocket roller engageable with the film, a first driving element engageable with said transport means, a clutch provided between said sprocket roller and said driving element, a clutch control mechanism arranged on said main part and cooperating with the film transport means to engage said clutch with said driving element and including a manually operated control element to disengage said clutch from said driving member, means for blocking said sprocket roller when said detachable part is in said end position, and take-up spool arresting means arranged in said detachable part to permit the rotation of said spool in direction opposite to said film advancing direction when at least a portion of the film is wound up on the spool and to arrest the rotation of the spool in said opposite direction when the spool is empty.

2. The film cassette as defined in claim 1, wherein said clutch control mechanism is coupled to said driving element for said sprocket roller.

3. The film cassette as defined in claim 2, wherein said main cassette part includes a film supply chamber for receiving said film, a separate chamber including a film frame counting mechanism, said counting mechanism forming a part of said clutch control mechanism.

4. A film cassette as defined in claim 3, wherein said film frame counting mechanism includes an index disk provided with marks corresponding to the number of film frames and being movable from a "O" frame position, and further including a switching member mounted on said index disk and cooperating with said clutch control mechanism to release said manually reset control element to bring said clutch from its disengaged position to its engaged position with the driving element for said sprocket roller.

5. A film cassette as defined in claim 4, wherein said manually operated control element is a pushbutton which upon despression disengages said clutch and is held in its depressed position by said clutch control mechanism and released to its normal position by said switching element when said film frame counting mechanism is advanced.

6. A film cassette as defined in claim 5, wherein said switching element is a resilient torque secured at one end to said picture frame counting disk and having its other end directed against said arresting lever for said manually operable control element to displace the same when said counting disk is advanced in the feeding direction from its "O" picture frame position.

7. A film cassette as defined in claim 6, wherein said housing unit of said cassette includes an openable rear wall and said counting mechanism being coupled to said rear wall in such a manner that upon opening the rear wall the picture frame counting and indexing disk is automatically reset to its "O" frame picture counting position.

8. A film cassette as defined in claim 4, wherein said picture frame counting mechanism includes a ratchet wheel secured to said frame counting disk, a coupling pawl supported for rotation and for a movement in its longitudinal direction on said main cassette part, an eccentric drive for said coupling pawl, said eccentric drive being connected to said driving element for said sprocket roller to advance via said coupling pawl said indexing disk.

9. A film cassette as defined in claim 2, wherein said clutch includes an axially movable spring-biased coupling member supporting coupling jaws and a face gear secured opposite said coupling jaws to said sprocket roller, said coupling member being connected to said manually operable control element of said control mechanism.

10. A film cassette as defined in claim 9, wherein said control mechanism includes a pivotable elbow lever spring biassed into engagement with said manually opperable control element to hold the latter in its compressed position.

11. A film cassette as defined in claim 1, wherein said driving element for said sprocket roller includes a driving gear connected to a shaft support for rotation on said main cassette part.

12. A film cassette as defined in claim 11 wherein said blocking means is coupled to said driving shaft to block the rotation of the latter when said detachable cassette part is in its closed position with respect to said main part.

13. A film cassette as defined in claim 12, wherein said blocking means includes an arresting gear secured to said driving shaft and a pivotable lever having an arresting nose engageable with said arresting gear, said lever being spring biassed away from said arresting gear and cooperating with said detachable housing part to engage said arresting gear when said detachable cassette part is in its closed position.

14. A cassette as defined in claim 1, wherein said film is formed with a narrow leading tongue and said arresting device for said take-up spool includes a ratchet wheel secured to one end of said spool remote from said holding slot for the film tongue, and an arresting pawl normally spring-biassed into engagement with the teeth of said ratchet wheel and being disengaged from said ratchet wheel by the film wound on said take-up spool.

15. A film cassette as defined in claim 14, wherein said ratchet wheel of said arresting mechanism is formed on the periphery of the end portion of said take-up spool.

16. A film cassette as defined in claim 14, wherein said housing unit of said cassette includes releasing means arranged in said cassette housing unit cooperating with said arresting mechanism to disengage said arresting pawl when said detachable cassette part is in its closed position in contact with said main cassette part.

17. A film cassette as defined in claim 16, wherein said releasing means is a stationary projection formed on the inner wall of said housing unit and directed against said arresting pawl to lift the latter from engagement from said arresting ratchet when said detachable cassette part is moved towards said main cassette part.

18. A film cassette as defined in claim 17, wherein the end of said take-up spool adjoining said holding slot for the film is provided with an annular flange for manually turning said spool.

19. A film cassette as defined in claim 18, further including a second driving element for said take-up spool supported for rotation on the outer side of said detachable cassette unit and being engageable with the film transport means in the camera, and further including a sliding coupling arranged between said second driving element and said take-up spool.

20. A film cassette as defined in claim 19, wherein said take-up spool is in the form of a hollow cylindrical jacket, a second driving shaft connected to said second driving element and passing coaxially through said cylindrical jacket and said sliding coupling including a first coupling member connected to said cylindrical jacket and a second sliding member connected to said second driving shaft.

21. A film cassette as defined in claim 20, wherein said coupling members of said sliding clutch are in the form of face ratchet gears forming together a free wheeling coupling permitting the rotation of said take-up spool against the film advancing direction.

22. A film cassette as defined in claim 21, further including a second arresting device coupled to said driving shaft for the take-up spool to block the rotation of the latter in the direction opposite the advancing direction of the film.

23. A film cassette as defined in claim 22, wherein said second arresting mechanism includes a ratchet wheel secured to said driving shaft for the take-up spool and a resilient locking lever mounted on the housing of said detachable cassette part and engaging the teeth of said ratchet wheel of said second arresting mechanism.

24. A film cassette as defined in claim 23, wherein the ends of said driving shaft for said take-up spool project about the outer surface of the housing of said detachable cassette part to act as guiding elements for the detachable cassette part cooperating with corresponding guiding grooves in the camera.

25. A film cassette as defined in claim 1, wherein said man cassette part includes a film supply chamber and said sprocket roller being arranged between said film supply chamber and said take-up spool.

26. A film cassette as defined in claim 1, wherein said main cassette part includes a film supply chamber adapted for receiving a film cartridge for a small format film and said camera including a rewinding handle engageable with said film cartridge.

27. A film cassette having a cassette main part for receiving a supply of a film and a detachable cassette part movable transversely to the longitudinal axis of said main cassette part into a detached end position and a closed position in which it forms with the main cassette part a light tight housing unit, said main cassette part including a film supply chamber and having its edge portion formed with an elongated slot-like opening having a length sufficient for passing through the film when said detachable cassette part is in its end position, and a locking slider movable mounted on said main cassette part to cover said slot-like opening and to act simultaneously as a locking member for said detachable cassette part when the latter is in its closed position.

28. A film cassette as defined in claim 27, wherein said locking slider is guided on said main cassette part and spring-biassed into a position covering said slot-like opening and locking siad detachable cassette part.

29. A film cassette as defined in claim 28, wherein said locking slider is provided with at least one projecting actuation cam engageable with a light shielding rim of the camera to displace the slider against its biasing spring.

30. A film cassette as defined in claim 29, wherein said detachable cassette part is provided with resiliently supported locking cams engageable with corresponding locking recesses in the cassette main part.

31. A film cassette as defined in claim 30, wherein said detachable cassette part is provided with two opposite carrier pins engageable with the cassette control means.

32. A film cassette as defined in claim 31, wherein said carrier pins are arranged on the same sides of the detachable cassette part where the ends of the driving shaft for the take-up spool project.

33. A film cassette as defined in claim 27, wherein said locking slider extends over the entire separation line between said cassette parts at one side of the cassette housing and has bent sides partially overlapping the adjoining lateral sides.

34. A film cassette as defined in claim 27, wherein the main cassette part is provided with a film sensitivity indicator including a longitudinally displaceable slider provided with a projecting feeler which cooperates with a corresponding scanner in the camera to automatically adjust the exposure parameters of the camera according to the said film sensitivity.

* * * * *